(12) United States Patent
Phillips et al.

(10) Patent No.: US 9,145,920 B2
(45) Date of Patent: Sep. 29, 2015

(54) BURR RESISTANT FASTENER-MOUNTED BEARING ASSEMBLY

(71) Applicant: Emerson Power Transmission Corp., Florence, KY (US)

(72) Inventors: Scott W. Phillips, Valparaiso, IN (US); Kim D. Hoffmann, Chesterton, IN (US)

(73) Assignee: Regal Beloit America, Inc., Beloit, WI (US)

( * ) Notice: Subject to any disclaimer, the term of this patent is extended or adjusted under 35 U.S.C. 154(b) by 49 days.

(21) Appl. No.: 14/059,956

(22) Filed: Oct. 22, 2013

(65) Prior Publication Data

US 2015/0110435 A1 Apr. 23, 2015

(51) Int. Cl.
F16C 35/063 (2006.01)
F16C 33/58 (2006.01)
F16C 35/04 (2006.01)

(52) U.S. Cl.
CPC ............. *F16C 33/586* (2013.01); *F16C 35/047* (2013.01)

(58) Field of Classification Search
CPC ..... F16C 35/073; F16C 33/586; F16C 35/047
See application file for complete search history.

(56) References Cited

U.S. PATENT DOCUMENTS

| 930,169 | A | 8/1909 | Exley |
|---|---|---|---|
| 4,012,086 | A | 3/1977 | Kruse |
| 4,074,923 | A | 2/1978 | Howe, Jr. |
| 4,403,814 | A | 9/1983 | Koss et al. |
| 5,267,485 | A | 12/1993 | Chi |
| 5,685,650 | A | 11/1997 | Martinie et al. |
| 5,709,483 | A | 1/1998 | Martinie |
| 6,425,690 | B1 | 7/2002 | DeWachter |
| 6,530,716 | B2 | 3/2003 | Grimmel |
| 2003/0138292 | A1* | 7/2003 | Zeng ............................ 403/362 |
| 2006/0291764 | A1 | 12/2006 | Ravindra et al. |
| 2007/0029067 | A1 | 2/2007 | Kidwell et al. |
| 2009/0016661 | A1 | 1/2009 | Casey et al. |

FOREIGN PATENT DOCUMENTS

GB 1127587 * 9/1968

OTHER PUBLICATIONS

International Search Report and Written Opinion from corresponding PCT International Patent Application No. PCT/US2014/060911 dated Jan. 26, 2015 (ten pages).

* cited by examiner

*Primary Examiner* — Thomas R. Hannon
(74) *Attorney, Agent, or Firm* — Harness, Dickey & Pierce, PLC

(57) ABSTRACT

A bearing assembly for rotatably supporting a shaft member. The bearing assembly has an inner ring having an inner surface sized to receive the shaft member therein. A first fastener threadedly engages a first fastener aperture formed in the inner ring such that a distal end of the first fastener engages the shaft member to selectively retain the inner ring to the shaft member for rotation therewith. A first groove extends along the inner surface of the inner ring and is aligned with the first fastener aperture formed in the inner ring. The first groove is sized to permit clearance between a burr or other obstruction formed on an exterior surface of the shaft member.

16 Claims, 3 Drawing Sheets

BURR RESISTANT FASTENER-MOUNTED BEARING ASSEMBLY

FIELD

The present disclosure relates to bearing assemblies and, more particularly, relates to bearing assemblies having a fastener-mounted bearing assembly.

BACKGROUND AND SUMMARY

This section provides background information related to the present disclosure which is not necessarily prior art. This section further provides a general summary of the disclosure, and is not a comprehensive disclosure of its full scope or all of its features.

In conventional fastener type bearing assemblies, a ring member is often secured to a shaft member using one or more fasteners, such as setscrews, disposed about the ring member. The fastener is a traditional threaded fastener that extends through the inner ring of the bearing assembly and engages the shaft member that is rotatably supported by the bearing assembly. The mechanical or frictional engagement of the fastener against the shaft member serves to retain the shaft member and inner ring of the bearing assembly in a coupled relationship.

However, it has been found that the mechanical or frictional engagement of the fastener against the shaft can result in the formation of a burr or other rough edge or ridge left on the surface of the shaft. The burr can form due to material characteristics of the fastener and/or shaft and associated installation and/or operation conditions. This burr can become even more pronounced as the result of any one or more conditions often present in operation, such as vibration or other loading forces.

During removal of the bearing assembly or collar from the shaft member, the burr must be first removed or otherwise plastically deformed so as not to obstruct the bearing assembly during removal. The removal of the burr requires knowledge of a required sequence of steps and the proper tools. Failure to do these steps typically results in the bearing assembly becoming stuck or otherwise physically joined to the shaft and potential damage to one or more of the shaft member and the bearing assembly. This can contribute to downtime.

According to principles of the present teachings, the bearing assembly is configured to minimize burr-related encumbrances between the inner ring and the shaft member for improved ease of removal.

More particularly, the present teachings provide a bearing assembly for rotatably supporting a shaft member. The bearing assembly has an inner ring having an inner surface sized to receive the shaft member therein. A first fastener threadedly engages a first fastener aperture formed in the inner ring such that a distal end of the first fastener engages the shaft member to selectively retain the inner ring to the shaft member for rotation therewith. A first groove extends along the inner surface of the inner ring and is aligned, at least at some portion, with the first fastener aperture formed in the inner ring. The first groove is sized to permit clearance between a burr or other obstruction formed on an exterior surface of the shaft member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
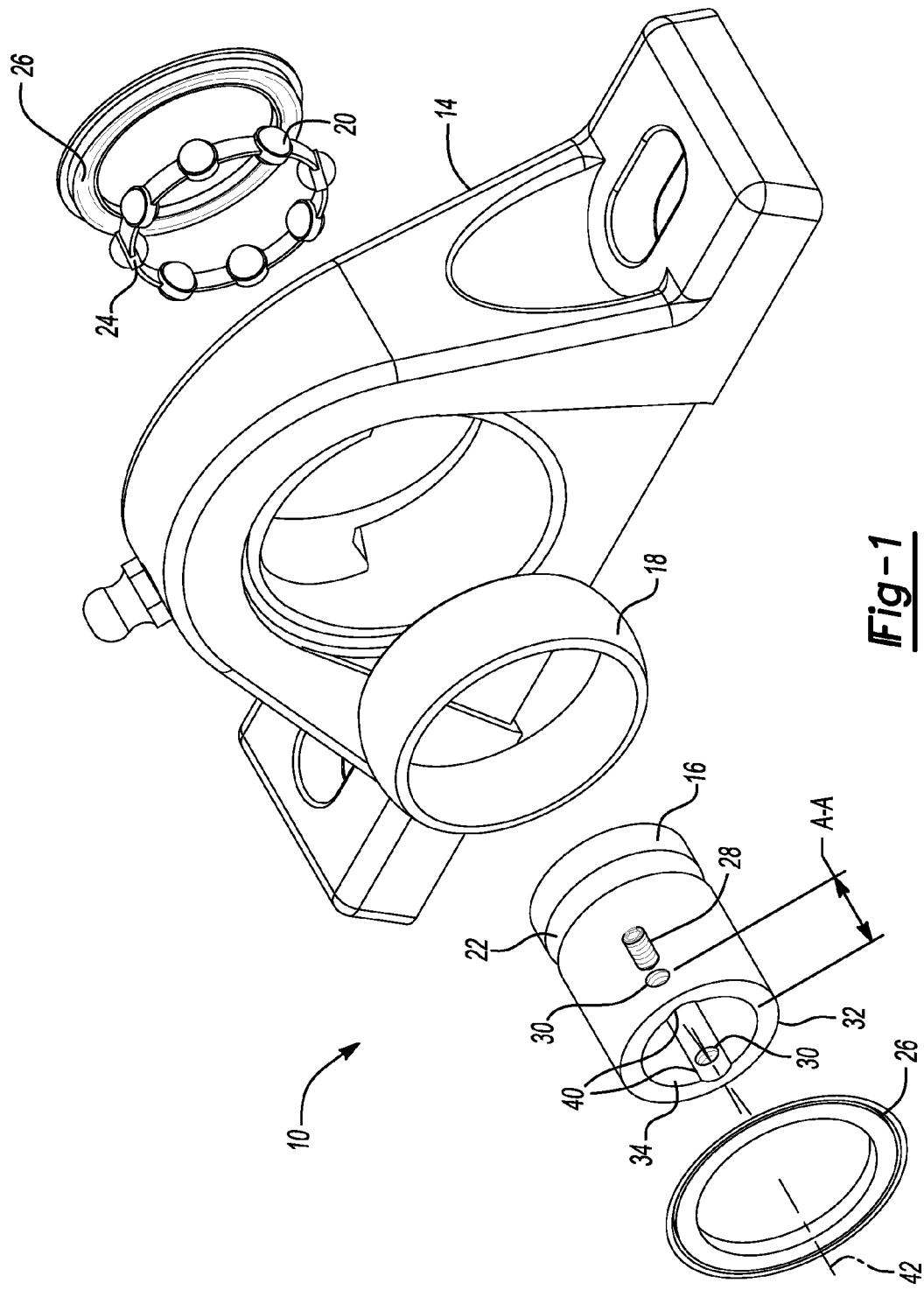
FIG. 1 is an exploded perspective view illustrating a bearing assembly according to the principles of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to,"

"directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, a bearing assembly 10 having an advantageous construction is illustrated in the associated figures and described herein. With particular reference to FIGS. 1-4, the bearing assembly 10 is configured for use with a shaft member 12 (FIG. 2). More particularly, bearing assembly 10 can comprise a bearing housing 14 having an inner ring 16 rotatably disposed within an outer ring 18 within bearing housing 14. Inner ring 16 can be, at least indirectly, supported for rotation with shaft member 12 by a plurality of bearing rolling elements or other anti-friction members 20 positioned about an exterior side of inner ring 16 and an interior side of outer ring 18. In this way, the plurality of bearing rolling elements 20 can be positioned within a circumferentially-disposed raceway 22 extending between inner ring 16 and outer ring 18. In some embodiments, the plurality of bearing rolling elements 20 can be captured within a bearing cage 24. One or more annular seal members 26 can be used to engage opposing ends of inner ring 16, outer ring 18, bearing rolling elements 20, and/or bearing housing 14 to retain a lubricant (e.g. grease) within a volume containing bearing rolling elements 20.

Figure 2:
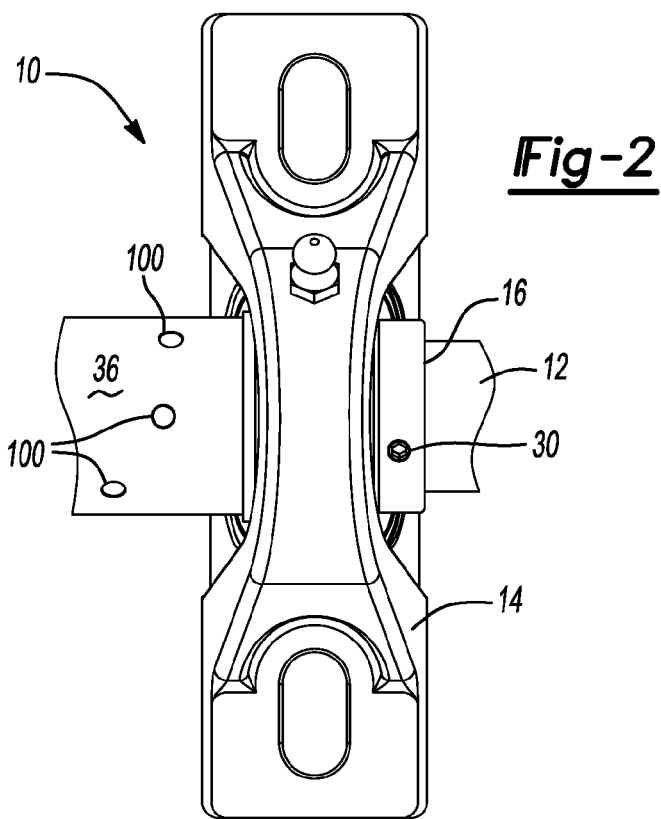
FIG. 2 is a perspective view illustrating a bearing assembly and a shaft member extending therethrough according to the principles of the present teachings.

In some embodiments, as illustrated in FIGS. 1 and 2, inner ring 16 is cylindrical in cross-section having an outer diameter sized and/or shaped to provide an operable bearing surface or raceway for the plurality of bearing rolling elements 20. Inner ring 16 is configured to be a "wide-inner" type inner ring such that inner ring 16 defines an end-to-end length that is greater than an end-to-end length of outer ring 18—that is, an overall length of inner ring 16 is greater than an overall length of outer ring 18 in some embodiments. This greater length of inner ring 16 provides an exposed length or overhang land, generally indicated at A-A (FIG. 1), to receive one or more fasteners 28 within one or more radially-disposed fastener apertures 30 formed in inner ring 16. It should be understood, however, that inner ring 16 is not required to have a greater length relative to outer ring 18 and, thus, the length of outer ring 18 may also be equal to or greater than inner ring 16. Fastener apertures 30 are configured as threaded through-holes extending from the outer surface 32 to the inner surface 34 of inner ring 16, such that a fastener 28 can threadedly engage fastener aperture 30. As a result of engagement of fastener 28 within fastener aperture 30, a distal end of fastener 28 extends beyond inner surface 34 of inner ring 16 to engage an external surface 36 of shaft member 12, as will be described herein.

It should be understood that the principles of the present teachings should not be regarded as being limited to any one particular fastener 28. In fact, fastener 28 can include any one of a number of fastening systems, such as mechanical fasteners (e.g. setscrews, bolts, screws, removable rivets, or any other device engageable with the shaft member 12), press-connections, or any other fastening system that may result in a physical burr or other deformation on shaft member 12.

It should also be understood that fastener apertures 30 can be disposed at various locations about inner ring 16. Specifically, in some embodiments, fastener apertures 30 can be disposed equidistantly and circumferentially about inner ring 16. However, in some embodiments, fastener apertures 30 can be disposed at locations that are irregularly spaced in a longitudinal and/or circumferential directions.

In some embodiments, shaft member 12 is cylindrical in cross-section and sized and configured to extend within inner ring 16 of bearing assembly 10. More particularly, an outer diameter and shape of shaft member 12 closely conforms to an inner diameter and shape of inner ring 16. In this way, shaft member 12 can be slidably received within inner ring 16 such that external surface 36 of shaft member 12 is generally adjacent inner surface 34 of inner ring 16. Shaft member 12 and inner ring 16 are configured to be joined together such that inner ring 16 of bearing assembly 10 rotates with shaft member 12 about a longitudinal axis of shaft member 12.

In some embodiments, inner ring 16 is joined or otherwise coupled to rotate with shaft member 12 using fastener 28. More particularly, fastener 28 is threadedly engaged through fastener aperture 30 of inner ring 16, using a suitable driving device, such as a screwdriver, allen wrench, or other implement, such that the distal end thereof project within inner ring 16 to a distance beyond inner surface 34 to engage external surface 36 of shaft member 12. Threaded engagement of fastener 28 within fastener aperture 30 of inner ring 16 is continued until a sufficient engaging force is exerted upon external surface 36 to provide a frictional and/or mechanical coupling of inner ring 16 with shaft member 12.

Figure 3:
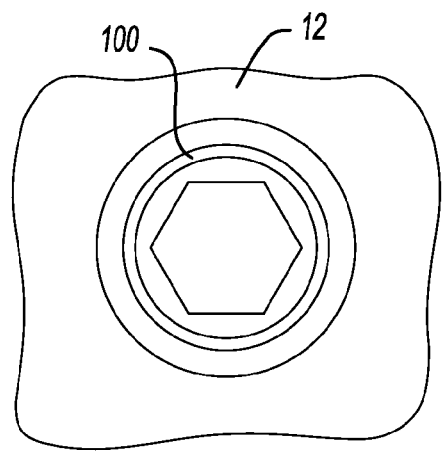
FIG. 3 is an enlarged view illustrating a burr formed on a shaft member.
Figure 4:
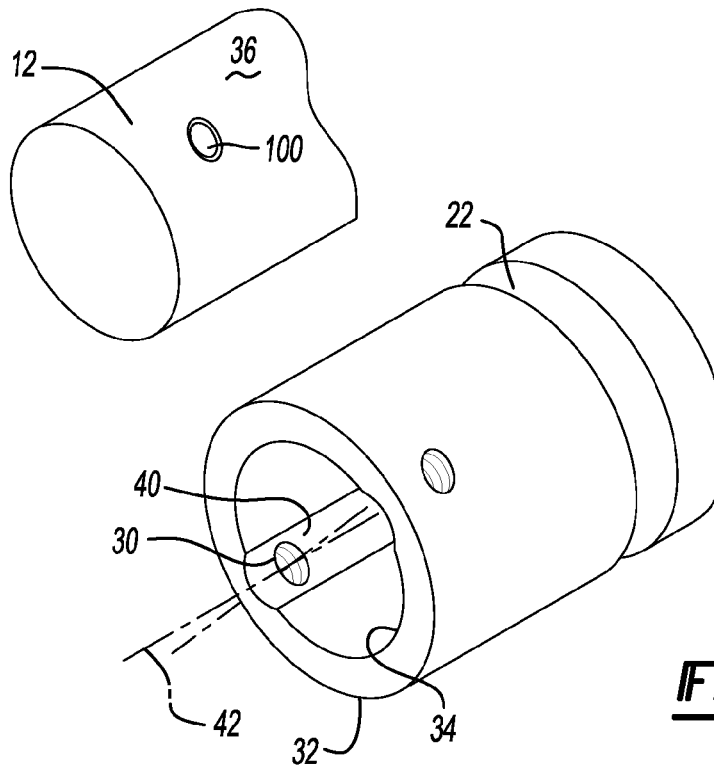
FIG. 4 is a perspective view illustrating a bearing assembly having a groove extending along an inner ring of the bearing assembly aligned with a threaded aperture receiving a fastener.
Figure 5A:
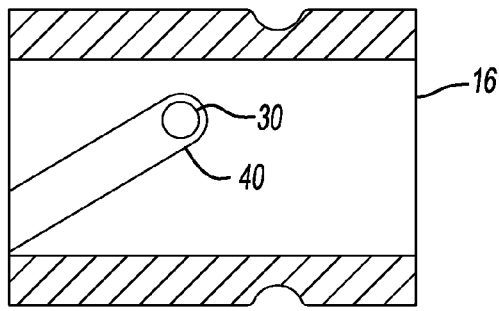
FIGS. 5A-5E are cross-sectional views illustrating the inner ring of the bearing assembly having a linear, sinusoidal, non-linear, and axial grooves according to the principles of the present teachings.
Figure 5B:
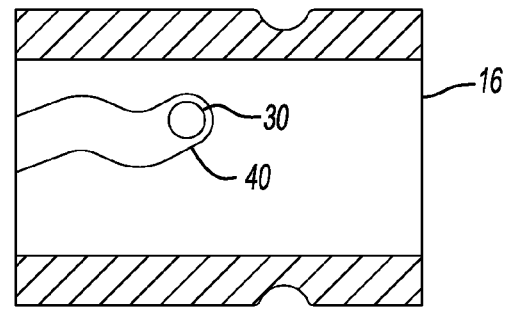
Figure 5C:
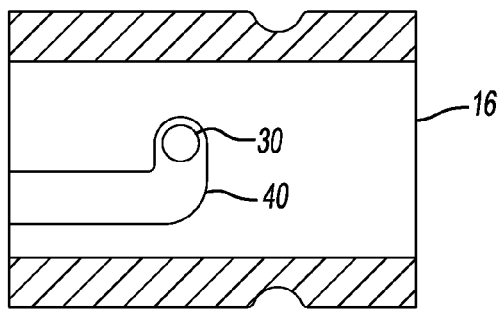
Figure 5D:
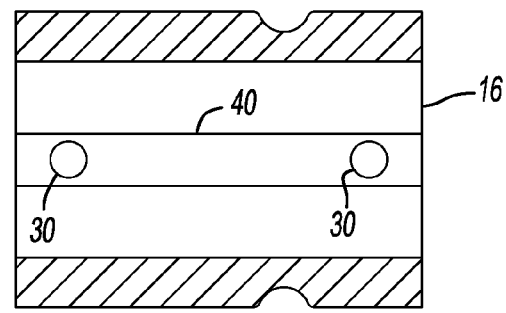
Figure 5E:
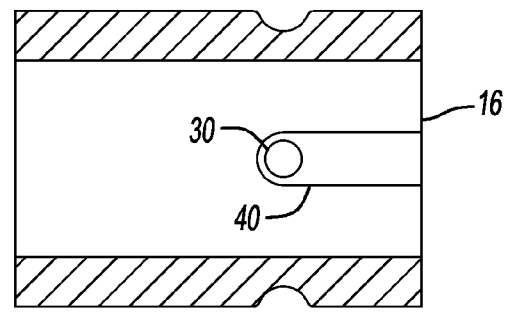

However, as described herein, this engagement of fastener 28 with external surface 36 of shaft member 12 can, and in some cases preferably, result in formation of a burr 100 or other upturned feature upon shaft member 12, such as that illustrated in FIGS. 2-4. As can be appreciated, formation of burr 100 can, in conventional installations, result in difficult and prolonged processing of the burr to permit removal of the shaft from the inner ring of the bearing assembly. However, according to the principles of the present teachings, as illustrated in FIGS. 1 and 4, inner ring 16 further comprises a groove 40 extending along inner surface 34 of inner ring 16 in a position aligned with fastener aperture 30. It should be understood that additional grooves 40 can be used in applications employing more than one fastener 28 extending through fastener apertures 30. In such cases, a separate groove 40 can be employed with each fastener aperture 30. In some embodiments, groove 40 can extend axially from a position aligned with fastener aperture 30 to an end of inner ring 16. However, it should be appreciated that alternative configurations are anticipated. By way of non-limiting example, in some embodiments, groove 40 can define a non-axial configuration extending from aperture 30 to one or more ends of inner ring 16, such as via an angled linear pathway (see FIG. 5A), a sinusoidal pathway (see FIG. 5B), a non-linear pathway (e.g. extending along a non-axial direction and changing to an axial direction) (see FIG. 5C), an axial pathway (see FIGS. 5D and 5E), or any other pathway that permits removal of inner ring 16 from shaft member 12 by passing the burr 100 along groove 40 from a position aligned with fastener aperture 30 to one or more of the ends of inner ring 16.

In some embodiment, groove(s) 40 is machined or otherwise formed along inner surface 34 of inner ring 16 and can extend along at least an axial portion thereof. In some embodiments, groove(s) 40 is aligned with fastener aperture 30 such that an axial centerline 42 (FIG. 4) of groove(s) 40 intersects a central axis of fastener aperture 30, thereby ensuring groove(s) 40 is immediately adjacent fastener aperture 30 and potential burr 100. In some embodiments, groove(s) 40 extends an entire length of inner surface 34 of inner ring 16—that is, groove(s) 40 extends from a first end to a second end of inner ring 16 to permit separation of bearing assembly 10 and shaft member 12 in opposing longitudinal directions. However, it should be understood that groove(s) 40 can extend from an area surrounding fastener aperture 30 to only one end of inner ring 16, if bearing assembly 10 and shaft member 12 will always be removed in a single direction.

In some embodiments, groove(s) 40 can define any one of a number of cross-sectional shapes capable of clearing burr 100. By way of non-limiting example, in some embodiments, groove(s) 40 can define an arcuate shape (see FIG. 4) to eliminate potential stress concentrations. In some embodiments, groove(s) 40 can define a channel shape or other cutout shape. It should be appreciated that the size, shape, and depth of groove(s) 40 should be selected so as not to negatively affect the heat treatment or shape of raceway 22 when mounted on shaft member 12. In some embodiments, groove(s) 40 is sized to permit slight rotation in a direction coaxial with the longitudinal axis of shaft member 12 to facilitate removal of inner ring 16 from shaft member 12.

According to the principles of the present teachings, several benefits and advantages are realized. By way of non-limiting example, the present teachings minimize burr-related encumbrances between the inner ring and the shaft member to permit a bearing user or operator to remove the inner ring from the shaft member without special tools or special knowledge regarding the burr. The present teachings can further provide benefits in minimizing the force and/or damage caused during the removal process of the inner ring from the shaft member.

Moreover, the groove(s) reduces the out-of-roundness of the raceway when mounted on the shaft. That is, it has been found that the use of groove(s) 40 as described herein can result in reduced out-of-roundness of the raceway 22 as compared to set screw mounted bearings without groove(s) 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bearing assembly for rotatably supporting a shaft member, said bearing assembly comprising:
    an inner ring having an interior bore having an inner surface, said interior bore sized to receive the shaft member therein, said inner ring further having a raceway groove circumferentially extending about an outer surface of said inner ring, said raceway groove being configured to guide a plurality of bearing rolling elements;
    a first fastener threadedly engaging a first fastener aperture formed in said inner ring, a distal end of said first fastener connectable with the shaft member to selectively retain said inner ring to the shaft member for rotation therewith; and
    a first groove having an arcuate cross-sectional shape extending linearly and axially along said inner surface of said interior bore of said inner ring, said first groove extending along said inner surface under and transverse to said circumferential raceway groove, said first groove being aligned with said first fastener aperture formed in said inner ring, said first groove being sized to permit clearance between a burr or other obstruction formed on an exterior surface of the shaft member and further being sized to prevent an out-of-round condition along said raceway groove.

2. The bearing assembly according to claim 1 wherein said first groove extends along said inner surface of said inner ring from a first end of said inner ring to an opposing second end of said inner ring.

3. The bearing assembly according to claim 1 wherein said first groove extends along said inner surface of said inner ring from a location adjacent said first fastener aperture and at least one end of said inner ring.

4. The bearing assembly according to claim 1 wherein said first groove is aligned with said first fastener aperture formed in said inner ring such that a central axis of said first groove intersects a central axis of said first fastener aperture.

5. The bearing assembly according to claim 1 wherein said first groove extends from said first fastener aperture to both ends of said inner ring.

6. The bearing assembly according to claim 1, further comprising:
    a bearing housing;
    an outer ring positioned in said bearing housing, said inner ring being positioned within said outer ring;
    a plurality of bearing rolling elements disposed in said raceway groove extending between said outer ring and said inner ring.

7. The bearing assembly according to claim 6 wherein an axial length of said inner ring is larger than an axial length of said outer ring to define an overhang land, wherein said first fastener aperture extends from an outer surface of said inner ring to said inner surface of said inner ring at said overhang land.

8. The bearing assembly according to claim 1, further comprising:
    a second fastener threadedly engaging a second fastener aperture formed in said inner ring, a distal end of said second fastener connectable with the shaft member to selectively retain said inner ring to the shaft member for rotation therewith; and
    a second groove extending along said inner surface of said interior bore of said inner ring, said second groove being aligned with said second fastener aperture formed in said inner ring, said second groove being sized to permit clearance between the burr or other obstruction formed on said exterior surface of the shaft member.

9. A bearing assembly for rotatably supporting a shaft member, said bearing assembly comprising:
   a bearing housing;
   an outer ring positioned in said bearing housing;
   an inner ring having an interior bore having an inner surface, said interior bore sized to receive the shaft member therein, said inner ring being positioned within said outer ring to form a raceway therebetween, said raceway circumferentially extending about an outer surface of said inner ring;
   a plurality of bearing rolling elements disposed in said raceway extending between said outer ring and said inner ring;
   a first fastener threadedly engaging a first fastener aperture formed in said inner ring, a distal end of said first fastener connectable with the shaft member to selectively retain said inner ring to the shaft member for rotation therewith; and
   a first groove having an arcuate cross-sectional shape extending linearly and axially along said inner surface of said interior bore of said inner ring, said first groove extending along said inner surface under and transverse to said circumferential raceway, said first groove being aligned with said first fastener aperture formed in said inner ring, said first groove being sized to permit clearance between a burr or other obstruction formed on an exterior surface of the shaft member and further being sized to prevent an out-of-round condition along said raceway.

10. The bearing assembly according to claim 9 wherein said first groove extends linearly along said inner surface of said inner ring from a first end of said inner ring to an opposing second end of said inner ring.

11. The bearing assembly according to claim 9 wherein said first groove extends linearly along said inner surface of said inner ring from a location adjacent said first fastener aperture and at least one end of said inner ring.

12. The bearing assembly according to claim 9 wherein said first groove is aligned with said first fastener aperture formed in said inner ring such that a central axis of said first groove intersects a central axis of said first fastener aperture.

13. The bearing assembly according to claim 9 wherein an axial length of said inner ring is larger than an axial length of said outer ring to define an overhang land, wherein said first fastener aperture extends from an outer surface of said inner ring to said inner surface of said inner ring at said overhang land.

14. The bearing assembly according to claim 9, further comprising:
   a second fastener threadedly engaging a second fastener aperture formed in said inner ring, a distal end of said second fastener connectable with the shaft member to selectively retain said inner ring to the shaft member for rotation therewith; and
   a second groove extending axially along said inner surface of said interior bore of said inner ring, said second groove being aligned with said second fastener aperture formed in said inner ring, said second groove being sized to permit clearance between the burr or other obstruction formed on said exterior surface of the shaft member.

15. A bearing assembly for rotatably supporting a shaft member, said bearing assembly comprising:
   an inner ring having an interior bore having an inner surface, said interior bore sized to receive the shaft member therein;
   a first fastener threadedly engaging a first fastener aperture formed in said inner ring, a distal end of said first fastener connectable with the shaft member to selectively retain said inner ring to the shaft member for rotation therewith; and
   a first groove extending along said inner surface of said interior bore of said inner ring, said first groove being aligned with said first fastener aperture formed in said inner ring, said first groove being sized to permit clearance between a burr or other obstruction formed on an exterior surface of the shaft member,
   wherein said first groove extends non-linearly from said first fastener aperture to at least one end of said inner ring.

16. A bearing assembly for rotatably supporting a shaft member, said bearing assembly comprising:
   an inner ring having an interior bore having an inner surface, said interior bore sized to receive the shaft member therein;
   a first fastener threadedly engaging a first fastener aperture formed in said inner ring, a distal end of said first fastener connectable with the shaft member to selectively retain said inner ring to the shaft member for rotation therewith; and
   a first groove extending along said inner surface of said interior bore of said inner ring, said first groove being aligned with said first fastener aperture formed in said inner ring, said first groove being sized to permit clearance between a burr or other obstruction formed on an exterior surface of the shaft member,
   wherein said first groove extends sinusoidally from said first fastener aperture to at least one end of said inner ring.

* * * * *